United States Patent [19]

Tracy et al.

[11] Patent Number: 5,686,128
[45] Date of Patent: Nov. 11, 1997

[54] APPARATUS AND METHOD FOR TRIPLE CO-EXTRUDING A SNACK PRODUCT

[75] Inventors: Gregory A. Tracy, Fort Smith, Ark.; Kevin Addesso, Muskego, Wis.; Donald C. Winfrey, Elmwood Park; Alger C. Marable, Hackettstown, both of N.J.; Robert Straka, Cape Coral, Fla.

[73] Assignee: Nabisco Technology Company, Wilmington, Del.

[21] Appl. No.: 522,449

[22] Filed: Aug. 31, 1995

[51] Int. Cl.$^6$ .................. A23P 1/00; B29C 47/00
[52] U.S. Cl. .................. 426/284; 264/45.9; 264/171.11; 425/114; 425/133.1; 425/462; 426/516
[58] Field of Search ............ 426/516, 284; 425/133.1, 114, 462; 264/45.9, 171.11, 172.11

[56] References Cited

U.S. PATENT DOCUMENTS

| | | | |
|---|---|---|---|
| 1,265,853 | 5/1918 | Wiseman | 425/133.1 |
| 3,241,503 | 3/1966 | Schafer | 425/133.1 |
| 3,528,130 | 9/1970 | Lefevre et al. | 425/133.1 |
| 4,028,024 | 6/1977 | Moreland | 425/133.1 |
| 4,125,585 | 11/1978 | Rosenbaum | 425/133.1 |
| 4,185,954 | 1/1980 | Murakami et al. | 425/133.1 |
| 4,340,994 | 7/1982 | dos Santos et al. | 426/246 |
| 4,364,882 | 12/1982 | Doucet | 425/133.1 |
| 4,533,308 | 8/1985 | Cloeren | 425/133.1 |
| 4,596,714 | 6/1986 | Brabbs | 426/629 |
| 4,657,496 | 4/1987 | Ozeki et al. | 425/133.1 |
| 4,661,360 | 4/1987 | Smith | 426/283 |
| 4,698,004 | 10/1987 | Ramnarine | 425/133.1 |
| 4,715,803 | 12/1987 | Koppa | 425/133.1 |
| 4,731,002 | 3/1988 | Spence et al. | 425/133.1 |
| 4,748,031 | 5/1988 | Koppa | 426/284 |
| 4,846,648 | 7/1989 | Spence et al. | 425/133.1 |
| 4,888,192 | 12/1989 | Ramnarine | 426/516 |
| 4,900,572 | 2/1990 | Repholz et al. | 426/516 |
| 5,000,968 | 3/1991 | Szwerc et al. | 426/283 |
| 5,004,619 | 4/1991 | Kobayashi | 426/516 |
| 5,318,417 | 6/1994 | Kopp et al. | 425/463 |
| 5,324,187 | 6/1994 | Cook | 425/462 |
| 5,393,536 | 2/1995 | Brandt et al. | 425/462 |

FOREIGN PATENT DOCUMENTS

3044535 A1  6/1982  Germany.
WO 95/31108  11/1995  WIPO.

*Primary Examiner*—George Yeung

[57] ABSTRACT

The triple coextrusion of snack food products having highly uniform and integral individual layers is achieved by the use of a compact, precisely toleranced coextrusion die which may be mounted at the outlet end of a cooker extruder. The coextrusion die includes a die block with smooth, unobstructed flow passages for each material. The outer passages for the casing material are substantially coaxial with the central axis of the die block and extend from end to end. A central bore and an annular passage having their central axes aligned with the central axis of the die block at its outlet end extend upstream to filler feed ports. The feed port entrances are at the outer surface of the die block between its ends. The side ports and filler feed lines connected to them do not interfere with a substantially straight flow path of casing material directly from a cooker extruder. A protruding tip formed at the outlet end of the die block by the bore and annular passage extends into a converging block or cone. The separate streams of casing material from the outer passages of the die block converge or reform in the cone into a seamless, unitary annular outer casing layer enrobing the outer filler, which enrobes the inner filler. The small diameter extrudate rope may be continuously shaped into small diameter snack products in a post-extrusion process such as crimping or molding with no substantial excess or waste.

15 Claims, 9 Drawing Sheets

APPARATUS AND METHOD FOR TRIPLE CO-EXTRUDING A SNACK PRODUCT

FIELD OF THE INVENTION

This invention relates to apparatus and a method for the triple co-extrusion of a snack product.

BACKGROUND OF THE INVENTION

In the mass production of snack foods or other food products, the extrusion process may be employed because it economically provides a high volume of product having a uniform configuration and structure. Usually, when designing an extrusion process and/or apparatus, the desired properties of the end product must be considered along with the processing characteristics of the individual components that make up the product. Often, these considerations may require the use of a specific method and/or apparatus to achieve a particular result.

In the design of mass production facilities for the co-extrusion of snack products, flow properties such as viscosity, handling properties or other processing characteristics of a particular material stream must be factored in. Certain material streams may be sensitive to variations in flow rate or direction caused by a circuitous flow path or obstacles in the flow path. Problems may arise such as high back pressure, insufficient mass flow rate and non-uniformity of individual layers in the product.

Certain materials may require an extremely smooth and uninterrupted flow path in order to remain either in an integral flow stream or a divided flow stream which is easily reformed into an integral one. If a change of direction occurs or an obstacle is present in the flow path, reformation may be difficult to achieve because the discrete streams may not reunite to form a uniform, integral flow. In this instance, the resultant product may have unacceptable qualities such as seam lines or striations.

In other instances, smooth flow paths for the individual streams may be required to prevent back pressure in pumps and related equipment and low mass flow rates, especially for viscous materials.

Also, co-extrusion apparatus often have many potential leak points, due to their multiple parts, complex configurations and high operating pressures. As the number of concentric layers increase in a coextrudate, for example when three or more layers are desired, die complexity increases quite rapidly. Generally, more parts are needed, flow paths become disrupted by inlet passages, more potential leak points are created, tolerances in the concentric passageways become tighter, flow path directions change more frequently or abruptly, and back pressures increase. These problems tend to become even more exacerbated as the desired final diameter of the coextrudate rope and final product decreases. In producing coextrudate ropes wherein one or more concentric layers expand upon exiting the extrusion die, the concentric passageways must be even smaller in diameter to achieve a desired final coextrudate rope diameter. For example, when coextruding a plurality of fillers with an expandable farinaceous-based cooked casing, from a cooker extruder, the casing may expand substantially upon exiting the triple coextrusion die. The outer concentric passage for the casing, and hence the remaining inner passageways for the fillings must be sized substantially smaller than the desired diameter of the expanded final product.

After the extrusion step, certain food or snack products are sometimes shaped in a manner to make them more aesthetically pleasing and/or bite-size. This usually requires post-extrusion processing by way of, for example, a candy making machine which severs the rope into individual pieces having the shape of the individual molds of the candy machine. In the instances where this type of post-extrusion processing is used, the extrudate rope to be fed into the post-extrusion step should have a diameter substantially the same size as the diameter of the final product or the mold. Matching of the diameters helps to avoid the production of excessive scrap during the continuous molding operation. For example, if a peanut shell-shaped expanded snack product is desired, the expanded extrudate rope should be substantially the same in diameter as the diameter of the final peanut product. The final product diameter may be relatively small if simulation of an actual peanut shell size or bite-size pieces are desired.

U.S. Pat. Nos. 4,715,803 and 4,748,031 to Koppa disclose an extruder which provides a triple co-extruded product having an inner layer, which is surrounded, or enrobed, by an intermediate layer, which is surrounded, or enrobed, by a third outermost layer. The inner layer is a dough having a chewy and moist texture when baked and the outer layer is a dough having a crispy texture after baking. These patents relate specifically to the introduction of a barrier material between the two dough layers in order to achieve the desired product stability and shelf life. The moisture barrier is injected through the outer cylindrical layer in a tube upstream of the extruder outlet.

A pillow-shaped product, having an outer layer of expanded dough and two different filler materials is disclosed in U.S. Pat. No. 4,698,004 and U.S. Pat. No. 4,888,192 to Ramnarine. The penetration of the outer expansible dough by the inner fillers in the end product is avoided through the use of a nozzle which can be adjusted to compensate for the effects of the fluid flow of the individual streams. The process is directed to the side-by-side extrusion of the filler materials.

U.S. Pat. No. 3,241,503 to Schafer discloses a die for the manufacture of cookies with concentric rings of different colored dough. The process involves introducing successive layers of dough through conduits perpendicular to the die into annular cavities surrounding a longitudinally extending bore.

Co-extrusion is also used to manufacture multi-layered plastic articles. For example, U.S. Pat. Nos. 4,185,954 to Murakami, et al., 5,318,417 to Kopp, et al., and 5,324,187 to Cook describe apparatus and processes for manufacturing multilayered tubular or hollow plastic products where each outer layer is successively added downstream to surround the upstream added inner material or materials.

U.S. Pat. Nos. 4,125,585 to Rosenbaum, 4,731,002 to Spence, et al., and 4,846,648 to Spence, et al. describe method and apparatus for manufacturing multilayered plastic pipe where the inner layer is injected across the central layer and through a spider.

U.S. Pat. No. 4,364,882 to Doucet describes method and apparatus for manufacturing multilayered plastic pipe where the central layer is injected across the outer layer through a trefoil.

German patent DT 3044535 (published Jun. 24, 1982) describes method and apparatus for manufacturing multi-layered plastic pipe where one or two central layers are injected across the outer layer.

The present invention provides an apparatus and method for triple co-extrusion. The apparatus includes a unitary die block for all three materials and is very compact. The apparatus may be manufactured to precise dimensional tolerances and it has smooth and uninterrupted flow paths. The extrusion of a small diameter extrudate rope with a central filler enrobed by an outer filler, subsequently enrobed by an outer casing formed from multiple streams is achieved by the use of the apparatus of the invention. The outer casing material streams reform into an integral concentric layer which enables a very high quality product to be obtained having no or substantially no seam lines or striations in the outer casing. The extrudate ropes may be sufficiently small in diameter, even when the casing is expanded, to allow feeding into a candy machine to produce small diameter snack products without substantial waste or scrap material. The apparatus also has a low potential for leakage or back pressure due to its unitary design and smooth flow passages.

SUMMARY OF THE INVENTION

The present invention provides an apparatus and method for triple co-extrusion of food products such as snack foods. The co-extrusion die may be used to obtain a triple co-extrudate having an optionally expanded casing enrobing two fillers. The casing may be produced in a cooker extruder and fed directly into the triple coextrusion die which is mounted at the outlet end of the cooker extruder. A co-extrudate is formed from two fillers and then a casing is formed, surrounding the co-extrudate, from a plurality of streams. The apparatus includes a unitary die block with separate, unobstructed passages for all three materials. The apparatus has a small, unitary design which may be used to achieve the extrusion of a small diameter extrudate rope for forming food or snack products having a mean diameter of approximately ½ inch. The outer casing flows through at least two longitudinally oriented outer passages and then reforms around the two concentric inner fillers.

The co-extrusion die of the present invention comprises a die block with at least two outer passages for forming the outer casing. The outer passages are supplied casing material from the inlet end of the die block and exit the outlet end of the die block. They are oriented at least substantially longitudinally with respect to the central axis of the die block. The outer passages may be substantially circular, elliptical or semicircular in cross section, or they may also be any other shape that is conducive to promoting smooth and uninterrupted flow and the resulting reunification of the individual outer casing streams as they exit the die block and reform around the centrally located fillers.

In the die block of the present invention, the innermost or central filler enters the side of the die block through a passage which connects to a bore having a central axis coincident with the central axis of the die block at the outlet end. The outer filler forms the middle layer positioned between the innermost filler and the outer casing. The outer filler enters the side of the die block through a passage which connects to an annular cavity surrounding the bore and extending to the outlet of the die block. In a similar manner to the flow of filler in the bore, the flow of filler in the annular cavity exits the die block along a central axis coincident with the central axis of the die block.

In embodiments of the invention, the annular cavity or passage and the bore form a protruding tip at the outlet end of the die block. A converging block or cone may be installed at the outlet of the die block around this protruding tip to facilitate the reformation and convergence of the outer casing material streams around the two fillers before they all exit the die. Also, a flow divider may be installed upstream of the die block to facilitate the smooth division of the flow of outer casing material into at least two outer passages. A holder may be used around the flow divider, die block and cone to encase them.

In a preferred embodiment of the present invention, the flow passages formed in the die block for the flow of outer casing material do not intersect with either the bore or the annular passage or their respective feed passages. This promotes the smooth, uninterrupted flow of the outer casing material through the die block and improves the reformation of the outer casing material by eliminating obstacles in the flow paths of the individual outer casing streams.

The fillers comprise edible materials such as jelly, peanut butter, fruit fillings, vegetable fillings, chocolate or candy fillings, cheese fillings and other fillings. The fillings may optionally include particles or chunks, for example chunks of peanuts or apple pieces.

The casing material may comprise a farinaceous material and may be a dough or an expansible dough such as a cookie dough, or cracker dough. Optionally, the casing may be a partially cooked or completely cooked material, such as a baked cookie dough, or cracker dough, or half product supplied to the triple co-extrusion die of the present invention via a cooker/extruder.

DETAILED DESCRIPTION OF THE INVENTION

The mass production of a triple co-extrudate both small in size and having highly uniform and integral individual layers is achieved in accordance with the present invention by providing smooth, unobstructed flow passages in a small die block. The die block may be manufactured with highly precise tolerances to provide uniform and integral individual layers in the extrudate rope. The small, compact design of the co-extrusion die provides a triple co-extrudate small in diameter. This permits the post extrusion processing of the extrudate into small pieces by machinery requiring a feed of small diameter rope. The central filler is uniformly surrounded by an outer filler to form a two filler co-extrudate. The co-extrudate is subsequently surrounded by multiple, converging streams of outer casing material which reform to achieve a highly uniform and integral outer layer without seams or striations.

Figure 1:
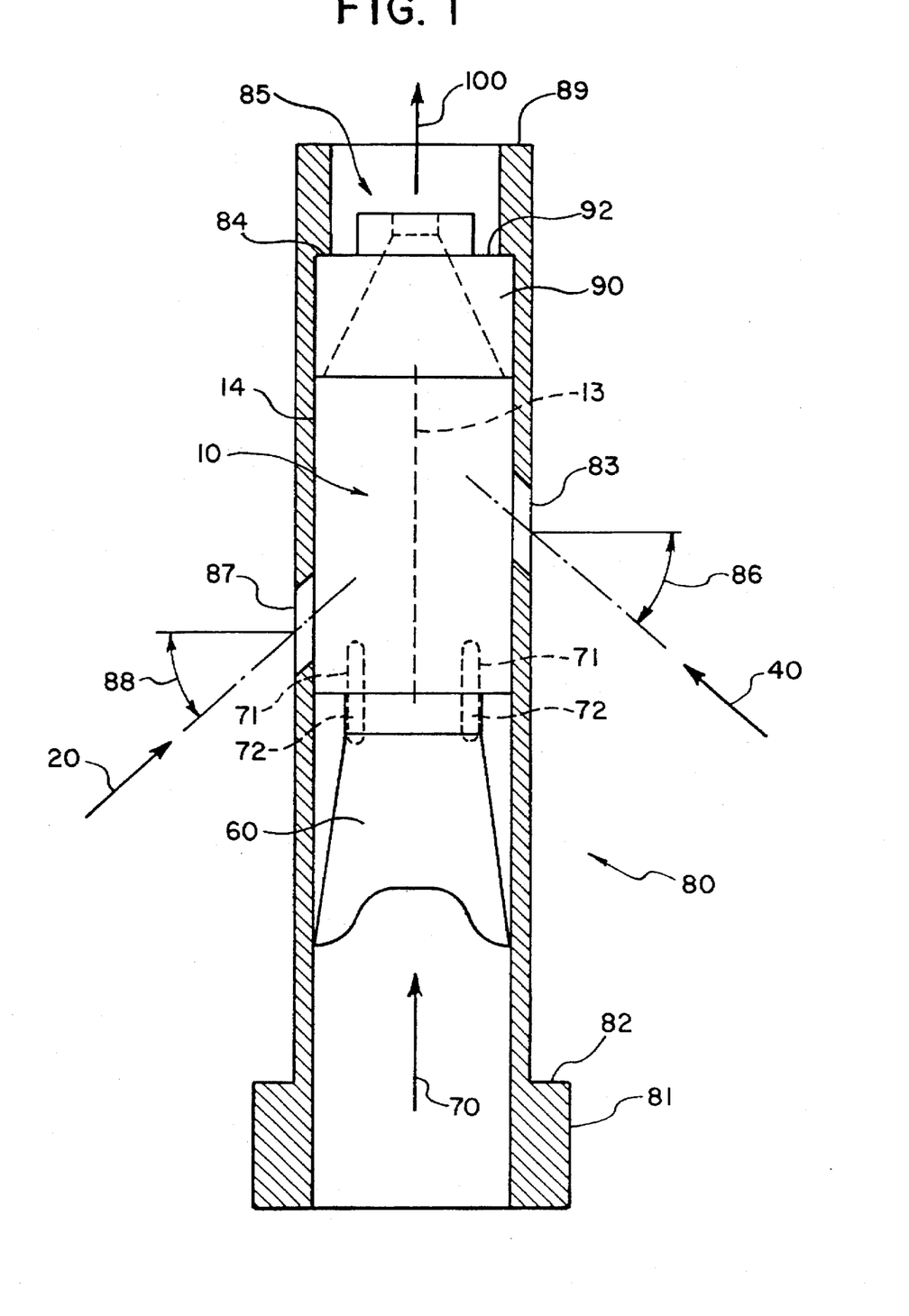
FIG. 1 is an enlarged, schematic side view of the co-extrusion die assembly in accordance with the present invention with the holder shown in cross-section along its central axis.

FIG. 1 is an enlarged, schematic side view of a triple co-extrusion die assembly of the present invention. The holder 80 is shown in cross section along its central axis, which is coincident with the central axis of the unitary die block 10 in this view of the assembled triple co-extrusion die. For simplicity, flow splitter 60, unitary die block 10 and cone 90 are shown schematically, rather than in a sectional view. Unitary die block 10 is shown here without a protruding tip.

As shown in FIG. 1, the co-extrusion die assembly comprises a holder 80 disposed about, from upstream to downstream, a flow splitter 60, unitary die block 10 and a converging block or cone 90. At the upstream end, holder 80 has an integral inlet flange 81. Flange 81 has a shoulder 82 adapted to receive a collar or slip flange (not shown) for attachment to a device such as an extruder, cooker/extruder, mixer or other device (not shown) to supply a flow of casing material 70 into the co-extrusion die assembly.

Holder 80 has a first feed port opening 87 and a second feed port opening 83, disposed at angles 88 and 86, respectively, to a perpendicular to the central axis of the holder 80 and central longitudinal axis 13 of the die block 10. Angles 88 and 86 are identical to the angles at which the first and second feed ports enter the unitary die block, respectively with respect to a perpendicular to the central longitudinal axis 13 of the die block 10. Angles 86 and 88 may or may not be equal to each other and may range from 0 degrees to about 70 degrees, preferably from about 35 degrees to about 55 degrees, and most preferably are about 45 degrees. Larger angles result in smooth flow, but increase the length of the die block and thus the length of the casing material passages. This results in the casing material being divided for a longer period of time and may inhibit reformation. The length of the unitary die block, including any protruding tip, is preferably less than about 4 inches, more preferably from about 3.25 inches to about 3.50 inches.

Larger angles also increase the possibility of the filler feed pipes interfering with the device supplying the casing material, if it is oriented longitudinally upstream of the die. Smaller angles tend to result in increased back pressure and may inhibit the smooth flow of the filler material.

Openings 83 and 87 are bored into the holder at locations and dimensions corresponding to their locations and dimensions on the outer surface 14 of the die block 10. Depending on the selection of angles 86 and 88 and the particular configuration of the unitary die block 10, opening 83 may be downstream of opening 87, as shown, or alternately, opening 87 may be downstream of opening 83. The size of these openings is also made sufficient for the installation of process equipment to supply filler material into the die assembly. Also, in other embodiments, the holes may be bored into the holder on the same side, to correspond with the configuration of unitary die block 10 shown in FIG. 4.

At the downstream end, holder 80 has a nozzle section 85. The length of the nozzle section is defined by the length of the reduced inner diameter section running from the inner shoulder 84 to the outlet end 89 of the holder 80. In a preferred embodiment, the length of the nozzle section is from about ½ inch to about 1 inch, more preferably about ¾ inch.

Inner shoulder 84 also functions to provide a stop point for the shoulder 92 of converging block or cone 90 when the cone 90 is inserted into the holder 80.

Figure 2:
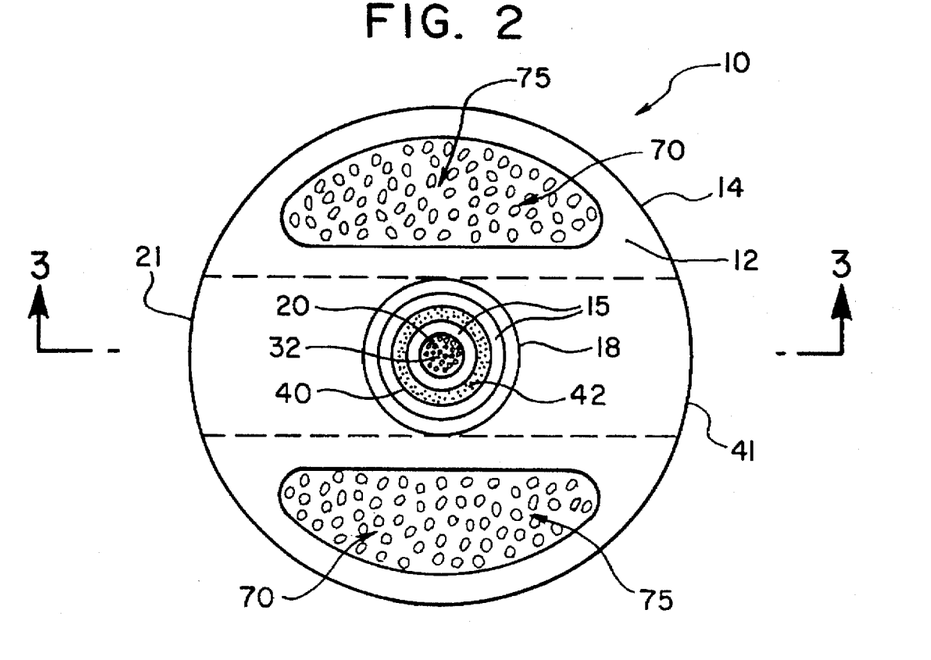
FIG. 2 is an enlarged schematic view of the downstream end of the unitary die block of the co-extrusion die assembly.
Figure 3:
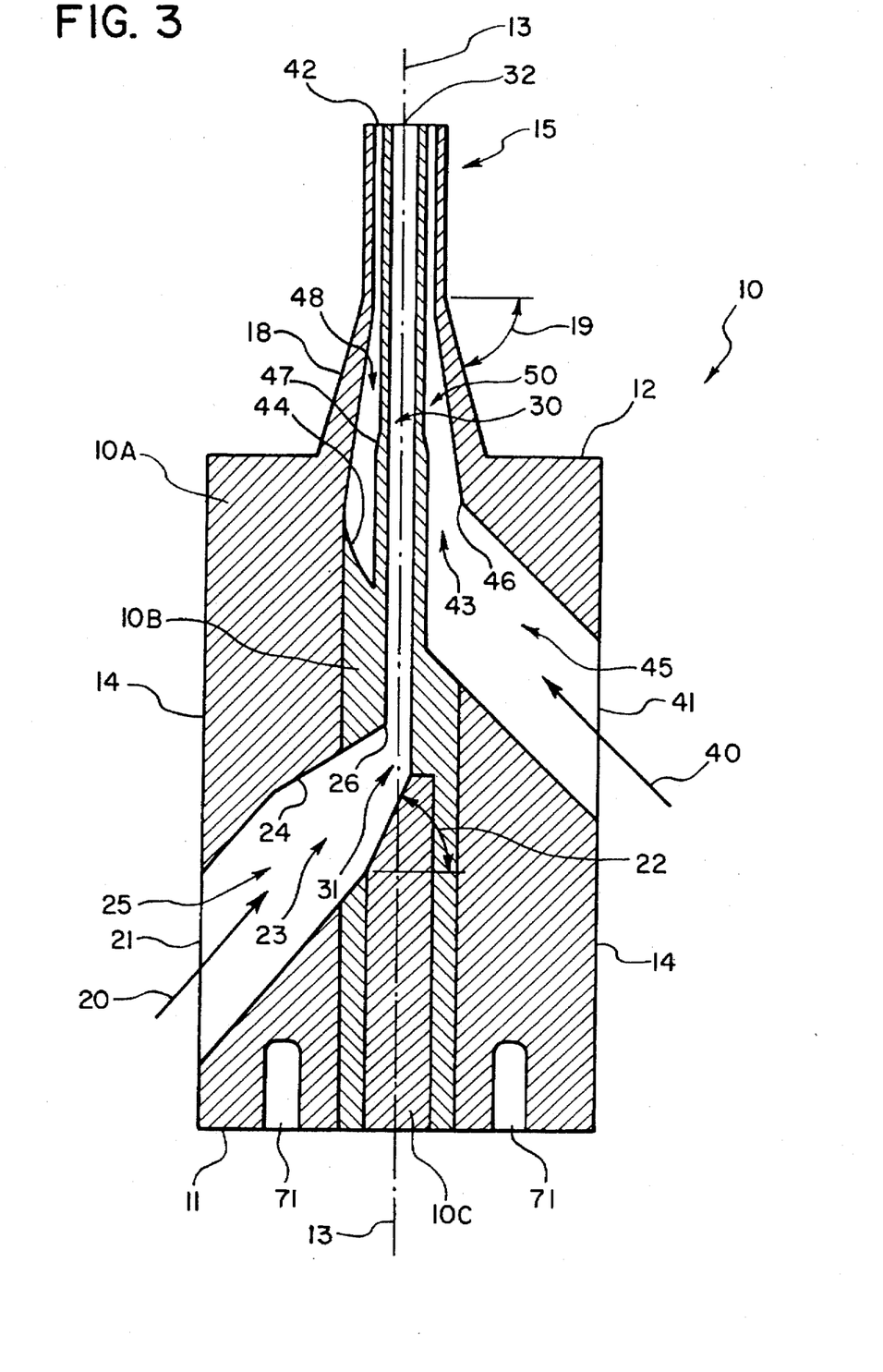
FIG. 3 is an enlarged cross-sectional side view of the unitary die block taken along line 3—3 of FIG. 2.
Figure 4:
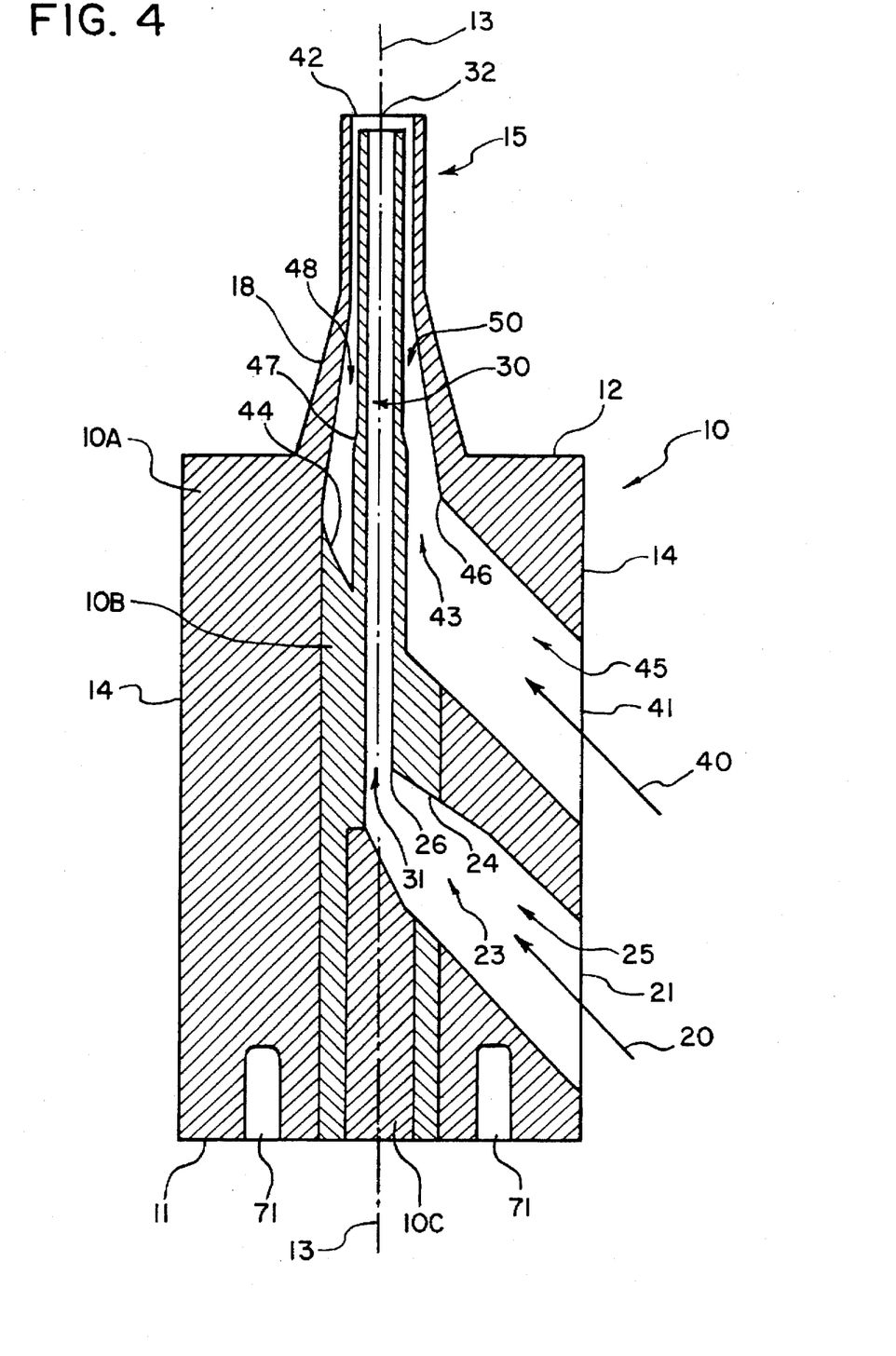
FIG. 4 is an enlarged cross-sectional side view similar to FIG. 3, showing another embodiment of the unitary die block.

As shown in FIGS. 2, 3 & 4, unitary die block 10 comprises an inlet end 11, an outlet end 12, a central axis 13, and an outer surface 14 disposed between the inlet end 11 and the outlet end 12. Unitary die block 10 is made from an outer die block 10A, an inner die block 10B, and plug 10C.

In a preferred embodiment, unitary die block 10 has a protruding tip 15 extending downstream from the outlet end 12 of the die block from about 1 inch to about 1.25 inches, preferably about 1.125 inches. Protruding tip 15 may have a tapered portion 18 from about ⅝ to about ¾ inch in length beginning at the die block outlet end 12 and ending at the upstream end of the non-tapered portion of protruding tip 15. The degree of taper 19 is preferably about 80 to 85 degrees, more preferably about 81 to 82 degrees, measured relative to a line perpendicular to central axis 13 as shown in FIG. 3.

Central filler material 20 is supplied to the unitary die block 10 via a feed device (not shown) such as a pump, a mixer or an extruder. Central filler material 20 enters the unitary die block 10 through the entrance 21 of first feed port 25. First feed port 25 may be located on the opposite side of die block 10 from second feed port 45 as shown in FIG. 3, or on the same side, as shown in FIG. 4. The feed ports 25 and 45 may optionally be drilled and tapped to accept, for example, ¼ inch pipe connecting the feed ports to their respective feed devices. The side feed ports 25 and 45 and their supply piping do not interfere with a substantially straight flow path of casing material directly from a cooker extruder, continuous mixer, or other mixing device.

Figure 6:
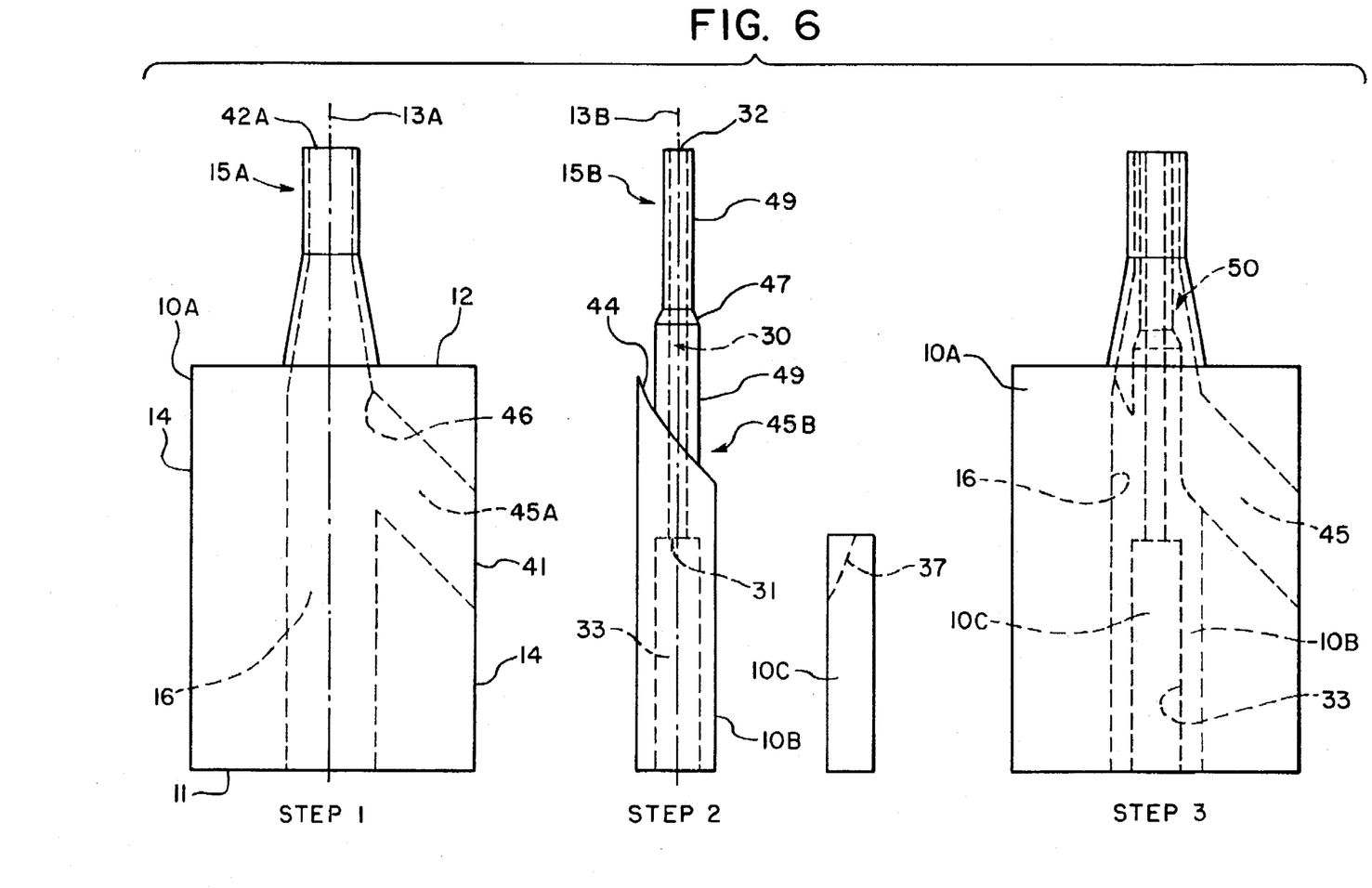
FIG. 6 is an enlarged, schematic side view showing fabrication steps for the unitary die block of FIG. 3.

In a preferred embodiment, a first feed port transition section 23 is formed with tapered walls 24 and an edge 26 that has been radiused to provide a smooth flow of central filler material 20 as it moves from transition section 23 into bore 30. The taper angle 22 of tapered walls 24 is preferably about 55 to 65 degrees, more preferably about 62 to 63 degrees, measured relative to a line perpendicular to central axis 13. Central filler material 20 flows into bore 30 at bore entrance 31 where the bore 30 and the first feed port 25 intersect. Central filler material 20 exits the bore at the downstream end of the protruding tip 15 at bore exit 32. The diameter of the bore at bore exit 32, corresponding to the inner diameter of inner die block protruding tip 15B shown in FIG. 6, is preferably from about 1/16 to about ⅛ of an inch, more preferably about 1/10 of an inch. The wall thickness of inner die block protruding tip 15B at bore exit 32 is preferably from about 20 to about 40 thousandths of an inch, more preferably about 30 thousandths of an inch. The central axis of bore 30 is aligned with the central axis of unitary die block 10 at the outlet end 12 of the unitary die block.

Outer filler material 40 is supplied to the unitary die block 10 via a feed device (not shown) such as a pump, a mixer or an extruder. Outer filler material 40 enters the unitary die block 10 through the second feed port entrance 41 and flows into second feed port 45. In a preferred embodiment, a second feed port transition section 43 is formed with tapered walls 44 and radiused edge 46, to provide a smooth flow of outer filler material 40 from transition section 43 into annular passage 50. Outer filler material 40 proceeds past transition section 43 into annular passage 50.

In preferred embodiments, tapered walls 47 allow the outer filler material 40 to flow smoothly into a reducing portion 48 of annular passage 50. The amount of taper of walls 47 may, for example, correspond to about 50 thousandths of an inch reduction in diameter per about 1/8 inch of longitudinal wall length. As shown in FIGS. 3 & 4, tapered walls 47 may be located downstream of the outlet end 12 of the unitary die block 10. Alternately, they may also be located upstream of outlet end 12, closer to transition section 43.

Reducing portion 48 is defined in large part on the outside by tapered portion 18 of protruding tip 15, and so their lengths and degree of taper generally correspond to each other. The reducing portion 48 may have about 1/8 to 1/4 inch shorter length than tapered portion 18, as can be seen from FIGS. 3 & 4. The degree of taper of reducing portion 48 may be either the same as degree of taper 19, discussed above, or a few degrees larger. Outer filler material 40 exits the annular passage at the downstream end of the protruding tip 15 at annular passage exit 42.

The difference between the inner diameter of outer die block protruding tip 15A at annular passage exit 42 and the outer diameter of the bore at bore exit 32, corresponding to the outer diameter of inner die block protruding tip 15B, both shown in FIG. 6, is preferably from about 1/16 to about 1/8 of an inch, more preferably about 1/10 of an inch. The wall thickness of outer die block protruding tip 15A at annular passage exit 42 is preferably from about 20 to about 40 thousandths of an inch, more preferably about 30 thousandths of an inch.

The cross-sectional areas of bore exit 32 and annular passage exit 42 for the co-extrusion of central filler material 20 and outer filler material 40, respectively, are shown in FIG. 2. The ratio of the annular passage exit area to the bore exit area is preferably from about 2:1 to about 4:1, more preferably about 3:1.

The central axis of annular passage 50 is aligned with the central axis of unitary die block 10 at the outlet end 12 of the unitary die block. It can also be seen in FIGS. 2 and 2A that the concentric relationship of the bore and annular passage must be precise, because it contributes to the uniformity of the final product.

In a preferred embodiment, as shown in FIG. 1, pin locating holes 71 are provided in unitary die block 10 for properly attaching a flow splitter 60 upstream of the unitary die block 10 using pins 72. In a similar manner, pins (not shown) may also be used to attach cone 90 to unitary die block 10.

Figure 5:
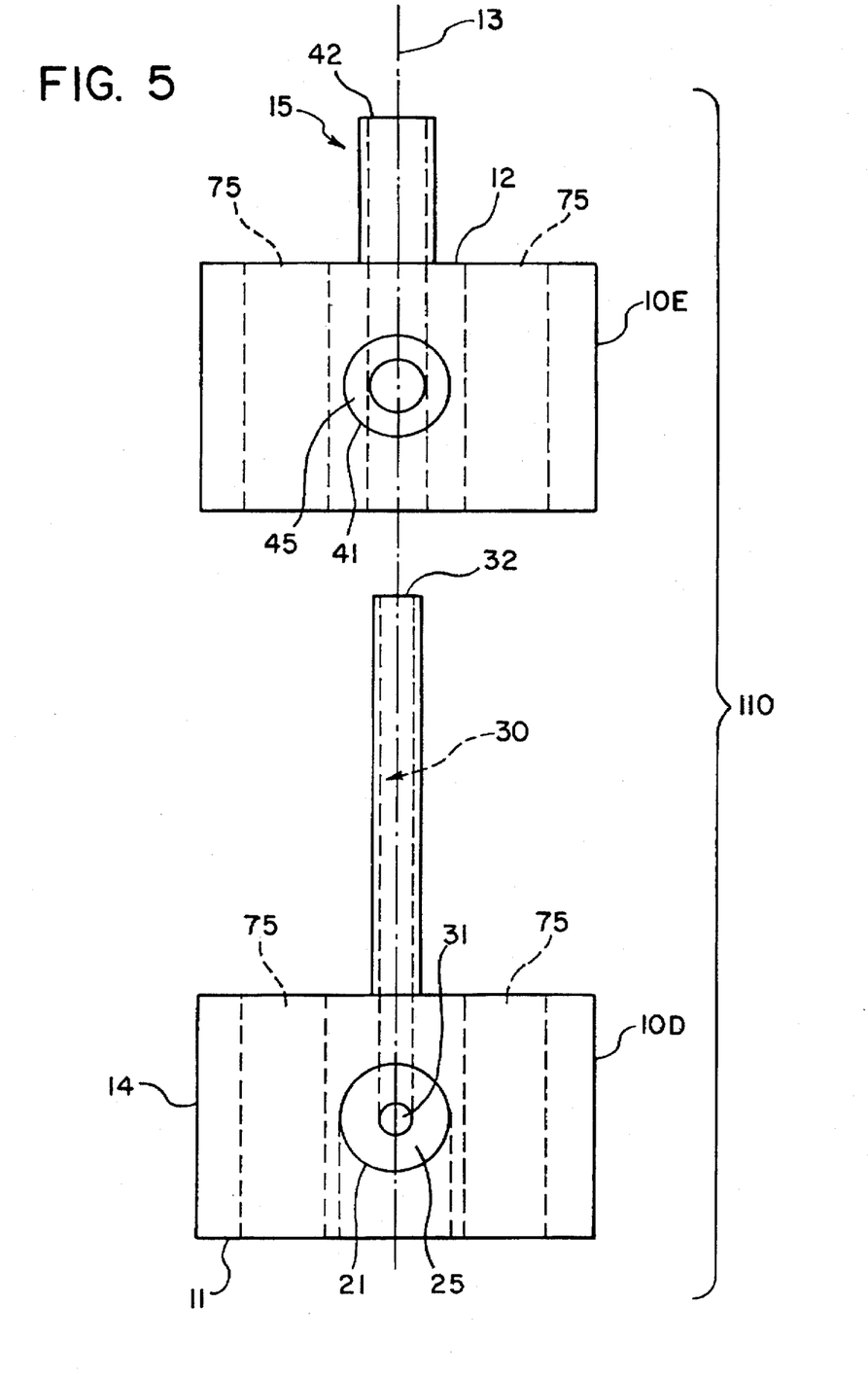
FIG. 5 is an exploded, enlarged schematic side view of another embodiment of the unitary die block.

FIG. 5 is an exploded, schematic side view of an embodiment wherein a unitary die block 110 is comprised of a bottom die block plate 10D and an upper die block plate 10E. In the view shown, the first feed port entrance 21 and the second feed port entrance 41 are on the same side of unitary die block 110. It can be seen that by rotating either plate 10E or 10D 180 degrees, the feed ports will be located on opposite sides of unitary die block 110. The plates may be welded after assembly to provide a unitary die block.

The unitary or multi-piece die blocks of the present invention may be fabricated using conventional machine tool techniques, such as drilling or boring, polishing, grinding, sawing, welding, and the like. Lasers may be used for drilling or boring or shaping the passages, for welding, and the like.

FIG. 6 shows fabrication steps for making the unitary die block 10 shown in FIG. 3. As shown in STEP 1, outer die block 10A is fabricated. It comprises an inlet end 11, an outlet end 12, a central axis 13A, and an outer surface 14 disposed between the inlet end and the outlet end. In a preferred embodiment, outer die block 10A has a protruding tip 15A.

Outer die block 10A is fabricated to provide second feed port entrance 41 and an entry portion of second feed port 45A. In another preferred embodiment, the second feed port is formed with a radiused edge 46, to provide a smooth flow of outer filler material 40 into annular passage 50.

A tapered bore 16 is provided, a portion of which becomes the outer surface of annular passage 50 after assembly. Tapered bore 16 also will provide a cavity for the insertion of inner die block 10B during assembly. The central axis 13A of tapered bore 16 and outer die block 10A will be coincident with the central axis 13 of unitary die block 10 after assembly. Similarly, the downstream end 42A of tapered bore 16 will become the outer edge of annular passage 50 at exit point 42, after assembly.

In STEP 2, inner die block 10B is fabricated. A surface 49 is formed on the downstream section of inner die block 10B, which will become the inner surface of annular passage 50 after assembly. A portion of second feed port 45B is also provided as well as protruding tip 15B.

Inner die block 10B is fabricated with bore 30 comprising bore entrance 31 and bore exit 32 and having a central longitudinal axis 13B. The central axis 13B of inner die block 10B and bore 30 will be coincident with the longitudinal central axis 13 of unitary die block 10 after assembly. Plug bore 33 is provided for the insertion of plug 10C during assembly. Plug 10C may optionally include a beveled surface 37 for the purpose of providing a portion of tapered walls 24 after assembly.

In a preferred embodiment, a portion of second feed port transition section 43 is formed by providing tapered walls 44. In another preferred embodiment, tapered walls 47 are formed on surface 49 of inner die block 10B. These preferred embodiments contribute to provide a smooth and uninterrupted flow of outer filler material 40 into and through annular passage 50 of the assembled die block 10.

In STEP 3, plug 10C is inserted into plug bore 33 of inner die block 10B. Inner die block 10B is inserted into tapered bore 16 of outer die block 10A in proper alignment so that second feed port 45 and annular passage 50 are formed, as described above.

In the final fabrication step, as shown in FIG. 3, die block 10 is completed by providing first feed port 25 in the assembly from STEP 3. As discussed above and shown in FIG. 4, first feed port 25 may be formed on the same side of die block 10 as second feed port 45.

After outer die block 10A, inner die block 10B and plug 10C have been assembled, they are welded together in their final, precise relationship to provide a unitary, precisely toleranced die block 10. The entire unitary die block assembly is very compact in length and diameter, and preferably has a diameter of less than about 2.5 inches, more preferably less than about 1.5 inches. The length of the unitary die block, including any protruding tip, is preferably less than about 4 inches, more preferably from about 3.25 inches to about 3.50 inches.

In a preferred embodiment, as shown in FIGS. 1, 3, and 4, pin locating holes 71 are provided in unitary die block 10 for attaching a flow splitter 60 upstream of the unitary die block 10.

Figures 7, 8:
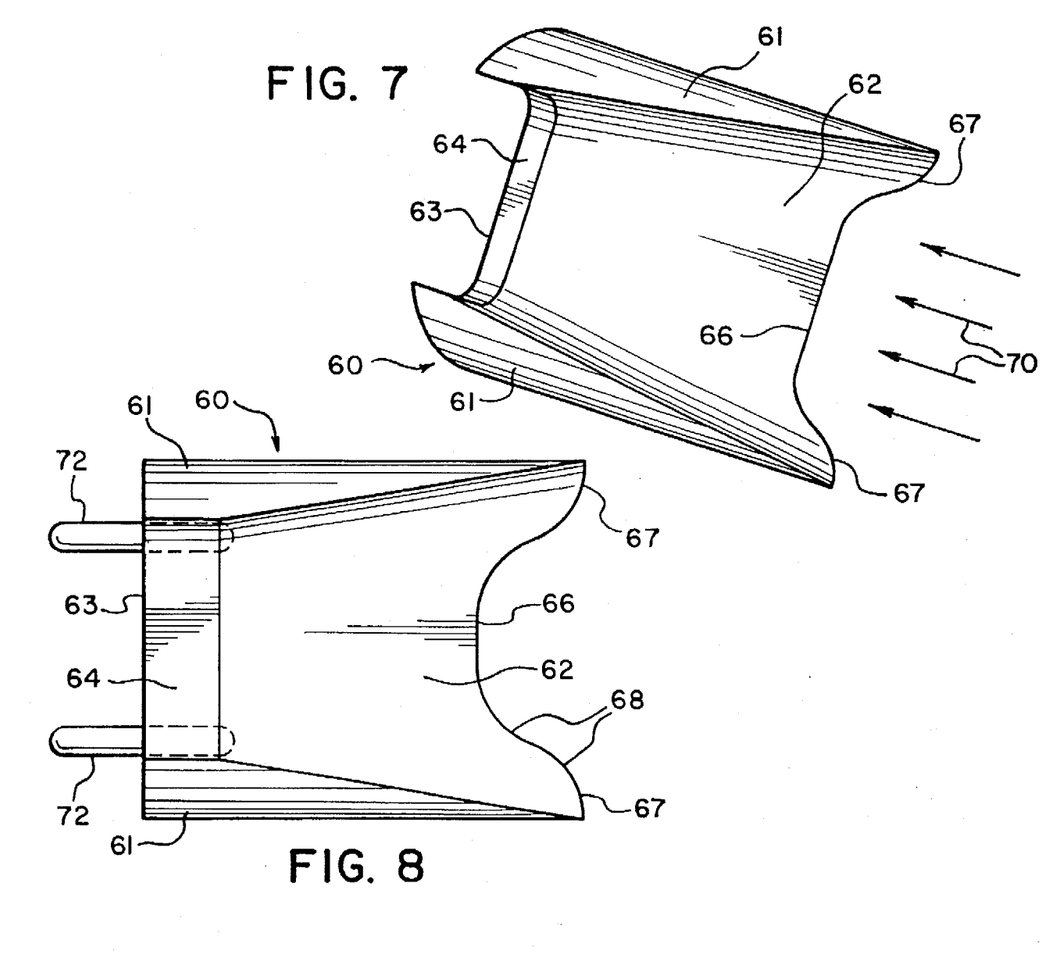
FIG. 7 is an enlarged, isometric side view of the flow splitter in accordance with the present invention.
FIG. 8 is an enlarged, schematic side view of the flow splitter of FIG. 7.
Figure 9:
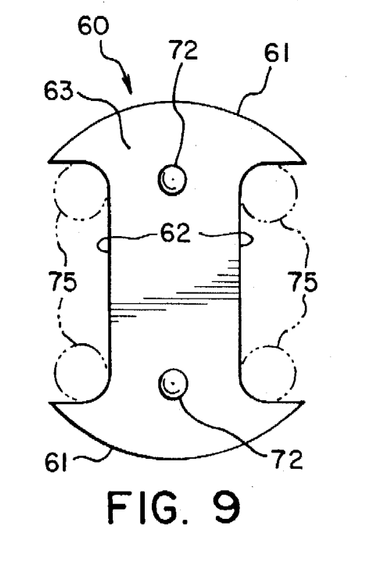
FIG. 9 is an enlarged, schematic view of the downstream end of the flow splitter of FIG. 7.

Flow splitter 60 is shown in FIGS. 7, 8 and 9. FIG. 7 is an enlarged, isometric side view of the flow splitter 60, FIG. 8 is an enlarged, schematic side view and FIG. 9 is an enlarged, schematic view looking from the downstream end of the flow splitter 60. It is generally wedge-shaped with rounded top and bottom walls 61. The top and bottom walls 61 and flow dividing surfaces 62 provide opposing channels for guiding the flow of outer casing material into the outer passages 75 of die block 10.

In a preferred embodiment, flow splitter 60 diverts the flow of outer casing material 70 smoothly and uniformly into a plurality of streams upstream of the die block 10. As the flow of outer casing material 70 meets the flow splitter, it encounters outer leading edges 67 and recessed inner leading edge 66. Preferably, leading edges 66 and 67 are rounded. The corners 68 providing the transition between inner and outer leading edges preferably have a radius of from about ¼ inch to about ⅜ of an inch, more preferably about 5/16 of an inch.

In the embodiment shown, the outer casing material 70 is split into two streams at the leading edges 66 and 67, and then flows along flow dividing surfaces 62 on opposing sides of the wedge-shaped flow splitter 60. The flow splitter 60 has an integral flange 64, preferably less than about ⅜ of an inch in length, the downstream side of which is the mating surface 63 for contact with the unitary die block 10. The entire length of the flow splitter, from mating surface 63 to the most upstream point of outer leading edge 67, is preferably from about 1.75 inches to about 2 inches.

The uniformly split flow of outer casing material 70 then flows through at least two outer passages 75 in the unitary die block 10. In the embodiment shown in FIG. 9, the four cylindrical outer passages 75 in the die block 10 are represented by four dotted circles to show their position relative to the flow splitter 60. The configuration of the mating surface 63, shown in FIG. 9, is determined by the type and shape of the outer passages 75 and is shaped in a manner to provide a smooth, uninterrupted flow of outer casing material 70 from flow dividing surfaces 62 into the outer passages 75.

Figure 2A:
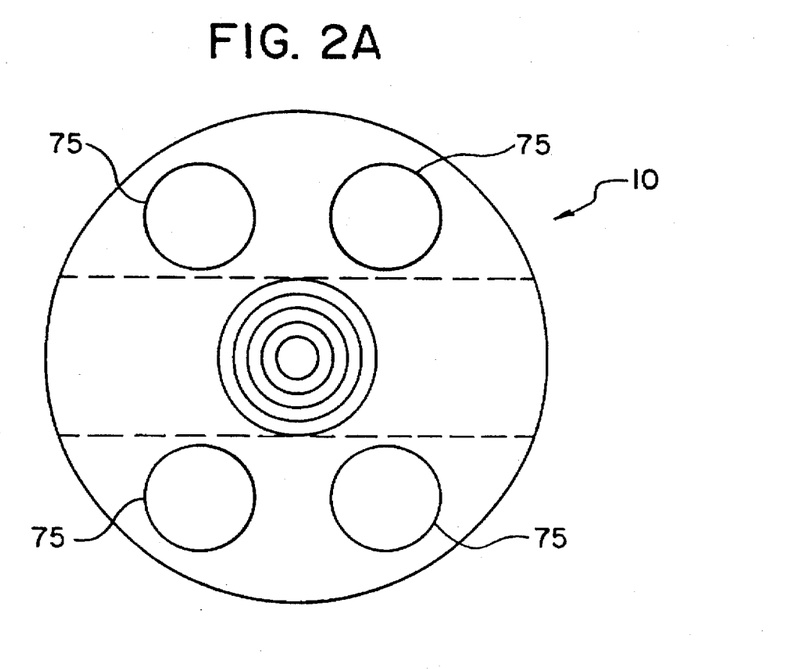
FIG. 2A is an enlarged schematic view of the downstream end of another embodiment of the unitary die block.
Figure 10:
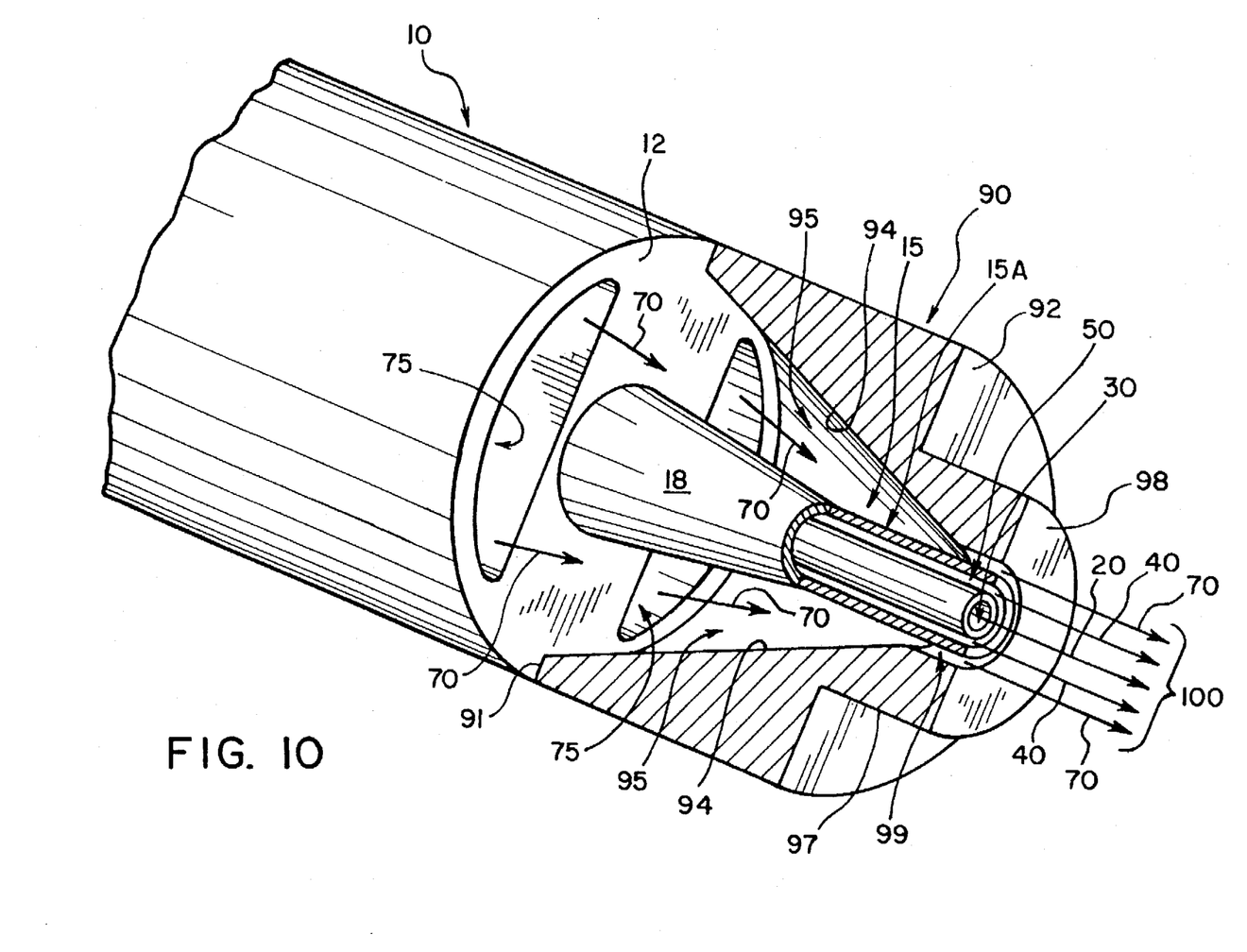
FIG. 10 is an enlarged, isometric view of the unitary die block and the converging block or cone in accordance with the present invention with the cone and a portion of the protruding tip shown in section.

The outer passages 75 are oriented longitudinally with respect to the central axis 13 of the die block 10. The at least two outer passages 75 may be substantially circular in cross section as shown in FIGS. 2A, 5 & 9, substantially elliptical in cross section, or substantially semicircular in cross section as shown in FIGS. 2 & 10. They may also be any other shape that achieves smooth and uninterrupted flow and the resulting reunification of the individual outer casing streams as they exit the die block 10 and reform about the co-extruded fillers 20, 40.

Figure 11:
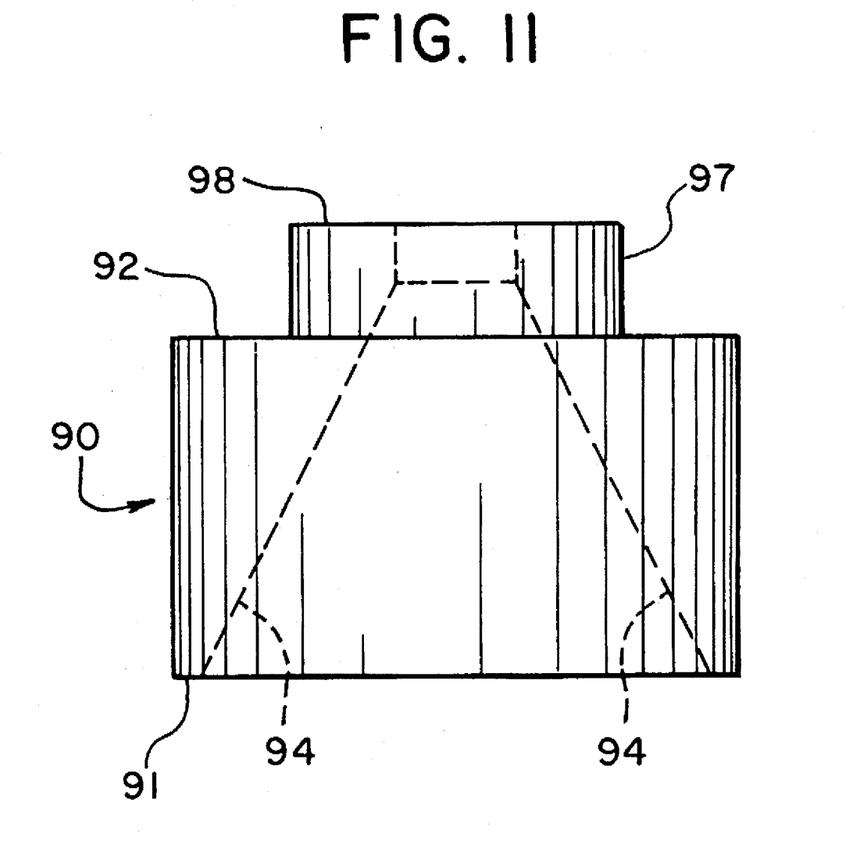
FIG. 11 is an enlarged, schematic side view of the cone of FIG. 10.

FIG. 10 is an enlarged, isometric view of unitary die block 10 and converging block or cone 90. Cone 90 and the non-tapered portion of the protruding tip 15A are shown in section to show the flow paths of the two filler materials and the outer casing material exiting the co-extrusion die. FIG. 11 is an enlarged, schematic side view of converging block or cone 90.

As shown in FIGS. 10 and 11, converging block or cone 90 has an inlet surface 91 which contacts and mates with the outside edge of outlet end 12 of unitary die block 10. In embodiments of the invention, the entire length of the cone 90 may be from about 1 inch to about 1.25 inches, preferably about 1.125 inches. The outer diameter of the cone 90 at its inlet surface 91 is essentially the same as the outer diameter of the unitary die block 10. The downstream end of the cone 90 reduces in diameter at shoulder 92, which provides cone nozzle 97 from the cone shoulder 92 to cone outlet surface 98. Cone nozzle 97 may preferably be about ¼ inch in length and from about ¾ inch to about 1 inch in diameter, more preferably about ⅞ inch in diameter.

FIG. 10 shows the installation of cone 90 on the outlet end 12 of the unitary die block 10. In embodiments of the invention, outer casing material 70 flows through the outer passages 75, shown here as two substantially semicircular passages, then it flows past the outlet end 12 of the unitary die block 10 and into conical annular region 95 defined initially by the tapered portion 18 of protruding tip 15 on the inside, and tapered walls 94 of the cone on the outside. Further downstream, conical annular region 95 is defined by the non-tapered portion of protruding tip 15 on the inside and tapered cone walls 94 on the outside. Finally, at a point upstream from the cone outlet 98, tapered cone walls 94 end and conical annular region 95 transitions into annular casing passage 99. The annular casing passage 99 may, for example, be approximately ⅛ inch in length.

The conical annular region 95 promotes the reunification and reformation of the individual casing material streams due to its reducing cross-sectional area and smooth, tapered walls. In the annular passage 99, shown here as cylindrical in shape, the outer casing material completes its reformation from the individual outer casing streams and becomes a seamless or substantially seamless, uniform and homogeneous flow.

This homogeneous flow of outer casing material moves past the outlet end 98 of the cone 90 and flows out of the cone 90, where it contacts and completely surrounds or enrobes outer filler material 40 exiting the die from annular passage exit 42, which contacts and substantially or completely surrounds or enrobes central filler material 20 exiting the die from bore exit 32.

In embodiments of the invention, the ratio of the annular passage 99 exit cross-sectional area containing the casing material 70 to the bore exit 32 cross-sectional area containing the central filler 20 may preferably be from about 3:1 to about 5:1, more preferably about 4:1.

The exit end 98 of the cone 90, the bore exit 32 and the annular passage exit 42 may all be flush at the point of formation of the triple co-extrudate 100. Alternately, in other embodiments of the invention, any one of them may be recessed relative to the others, or they each may be recessed relative to the other. For example, the bore exit 32 may be recessed from the annular passage exit 42 as shown in FIG. 4, which may be recessed from the cone exit 98, or vice versa. The bore exit 32 may be recessed, for example, 30 thousandths of an inch relative to the annular passage exit 42. This results in the outer filler impinging upon the inner filler at the point they exit the die. The relative configuration of these exits results in different properties in the extrudate rope, for example its size or configuration, and may be adjusted to influence those properties.

As shown in FIG. 10, triple co-extrudate rope 100 is formed downstream of cone exit or outlet 98. The triple co-extrudate rope 100 may be less than about ⅝ inch in diameter, preferably less than about ½ inch in diameter.

The rope 100 is sufficiently small so that, for example, upon crimping or molding in a post-extrusion apparatus for shaping the rope into a peanut shaped article, such as a candy making machine, there is no substantial excess or waste material generated.

Any suitable filler materials for a snack product may be used as the inner filler and outer filler in the present invention. The fillers may be cooked or uncooked. For example, the fillers may comprise jelly, peanut butter, jam, chocolate, or a filling made from fruit, vegetable, meat, candy, cooked dough, pudding, caramel, spices or seasonings such as cinnamon, cheese or other edible filler materials, and mixtures thereof. The fillings may optionally include particulate material or chunks, for example chocolate chips, butterscotch chips, or other flavor chips, chunks of nuts, pieces of fruits such as apple, cherry, peach, or banana, raisins, chunks of vegetables, candy or the like.

The present invention provides for the manufacture of a triple co-extrudate wherein at least one of the filler materials has a high viscosity, such as peanut butter. In preferred embodiments, the outer filler material is peanut butter and the inner filler material is jelly or chocolate. In other preferred embodiments, one filler may be an apple filler with apple particulates and the other filler may comprise caramel and cinnamon.

Even casing materials sensitive to separation and difficult to reform, such as a partially or completely cooked casing from a cooker/extruder, may be used in the present invention. The casing material may also comprise dough or an expansible dough. Exemplary casing materials which may be used include farinaceous based doughs such as cookie doughs, fermented or chemically leavened cracker doughs, half product doughs, crisp bread doughs, bread stick doughs, pretzel doughs, puffable doughs such as cheese ball doughs, and the like. The doughs are preferably at least substantially cooked in a cooker extruder prior to entry into the triple coextrusion die. Cookie and cracker doughs, such as a graham cracker dough, which are cooked in a cooker extruder prior to triple coextrusion are preferred.

The present invention provides smooth and uninterrupted flow passages for the outer casing material without obstacles in the flow path. Also, the compact length of the unitary die block contributes to the reforming of the outer casing because the residence time of the casing material in the at least two outer passages is short, and the separate streams are quickly reunited to form an integral outer casing layer.

What is claimed is:

1. A co-extrusion die for obtaining a triple co-extrudate having a casing enrobing two fillers, said die comprising:

a die block comprising an inlet end, an outlet end, an outer surface disposed between the inlet end and the outlet end, and at least two outer passages for forming said casing, said at least two outer passages being at least substantially coaxial with the central axis of the die block and being fed from the inlet end of the die block, and extending to the outlet end of the die block, and a bore having a central axis aligned with the central axis of the die block at the outlet end of the die block, said bore extending from the outlet end of the die block to a first feed port, said first feed port having an entrance at the outer surface of the die block between the inlet end and the outlet end, and an annular passage having a central axis aligned with the central axis of the die block at the outlet end of the die block, said annular passage surrounding said bore and extending from the outlet end of the die block to a second feed port, said second feed port having an entrance at the outer surface of the die block between the inlet end and the outlet end.

2. A co-extrusion die for obtaining a triple co-extrudate having a casing enrobing two fillers as claimed in claim 1, said die further comprising a converging block downstream of said die block for receiving and converging the casing from said at least two outer passages.

3. A co-extrusion die for obtaining a triple co-extrudate having a casing enrobing two fillers as claimed in claim 2 wherein said bore and said annular passage protrude from the outlet end of the die block to form a protruding tip which protrudes into said converging block.

4. A co-extrusion die for obtaining a triple co-extrudate having a casing enrobing two fillers as claimed in claim 3 wherein said bore has an outlet end recessed from an outlet end of said annular passage.

5. A co-extrusion die for obtaining a triple co-extrudate having a casing enrobing two fillers as claimed in claim 2, said die further comprising a flow splitter upstream of said die block.

6. A co-extrusion die for obtaining a triple co-extrudate having a casing enrobing two fillers as claimed in claim 5, said die further comprising a holder for holding said flow splitter, said unitary die block, and said converging block in alignment.

7. A co-extrusion die for obtaining a triple co-extrudate having a casing enrobing two fillers as claimed in claim 1 wherein said bore and said annular passage extend longitudinally to said first and second feed ports, respectively and wherein said first and second feed ports enter the die block at an angle of about 35 degrees to about 55 degrees with respect to a perpendicular to the central longitudinal axis of the die block.

8. A co-extrusion die for obtaining a triple co-extrudate having a casing enrobing two fillers as claimed in claim 1 wherein said die block comprises four substantially cylindrical outer passages.

9. A co-extrusion die for obtaining a triple co-extrudate having a casing enrobing two fillers as claimed in claim 1 wherein said die block comprises two substantially semicircular outer passages.

10. A co-extrusion die for obtaining a triple co-extrudate having a casing enrobing two fillers as claimed in claim 1 wherein at least one of the first and second feed ports does not pass through or intersect with an outer passage.

11. A co-extrusion die for obtaining a triple co-extrudate having a casing enrobing two fillers as claimed in claim 1 wherein said die block is unitary and has a diameter less than about 1.5 inches.

12. A co-extrusion die for obtaining a triple co-extrudate having a casing enrobing two fillers as claimed in claim 3 wherein said converging block comprises a conical passage for receiving and converging said casing from said outer passages.

13. A co-extrusion die for obtaining a triple co-extrudate having a casing enrobing two fillers as claimed in claim 1 wherein said casing and said two fillers are edible.

14. A method for preparing a triple co-extrudate having an outer layer enrobing two fillers, comprising:

supplying a flow of an outer layer material into an inlet end of a die block, wherein said flow is oriented substantially coaxially with a central axis of the die block and comprises at least two streams exiting an outlet end of the die block, and supplying a flow of a first filler material into the die block through a first feed port having an entrance at an outer surface of the die block and between the inlet and outlet end of the die block, wherein said flow of first filler material exits the outlet end of the die block through a bore having a central axis aligned with the central axis of the die block, and supplying a flow of a second filler material into the die block through a second feed port having an entrance at the outer surface of the die block and between the inlet and outlet end of the die block, wherein said flow of second filler material exits the outlet end of the die block through an annular passage surrounding said bore and having a central axis aligned with the central axis of the die block.

15. A method for preparing a triple co-extrudate having an outer layer enrobing two fillers as claimed in claim 14 wherein said outer layer material, said first filler material and said second filler material are edible.

* * * * *